United States Patent
Tsai et al.

(10) Patent No.: US 11,568,561 B2
(45) Date of Patent: Jan. 31, 2023

(54) LAMP AND METHOD FOR DETECTING A SITTING POSTURE OF A USER

(71) Applicant: Qisda Corporation, Taoyuan (TW)

(72) Inventors: Teng-Yi Tsai, Taoyuan (TW); Jiung-Cheng Pan, Taipei (TW)

(73) Assignee: Qisda Corporation, Taoyuan (TW)

( * ) Notice: Subject to any disclaimer, the term of this patent is extended or adjusted under 35 U.S.C. 154(b) by 113 days.

(21) Appl. No.: 16/884,121

(22) Filed: May 27, 2020

(65) Prior Publication Data
US 2020/0394817 A1    Dec. 17, 2020

(30) Foreign Application Priority Data
Jun. 17, 2019  (CN) .......................... 201910522406.9

(51) Int. Cl.
| | | |
|---|---|---|
| G06T 7/73 | (2017.01) | |
| G06T 7/62 | (2017.01) | |
| F21V 33/00 | (2006.01) | |
| G08B 21/24 | (2006.01) | |
| H04N 7/18 | (2006.01) | |

(52) U.S. Cl.
CPC ............ *G06T 7/73* (2017.01); *F21V 33/0052* (2013.01); *G06T 7/62* (2017.01); *G08B 21/24* (2013.01); *H04N 7/183* (2013.01); *G06T 2207/30196* (2013.01)

(58) Field of Classification Search
None
See application file for complete search history.

(56) References Cited

U.S. PATENT DOCUMENTS

2018/0174320 A1* 6/2018 Hayashi ................ G08B 25/04

FOREIGN PATENT DOCUMENTS

| CN | 103400474 A | | 11/2013 |
|---|---|---|---|
| CN | 103791240 A | | 5/2014 |
| CN | 103400474 B | * | 5/2015 |
| CN | 104952221 A | * | 9/2015 |
| CN | 104952221 A | | 9/2015 |
| CN | 105354822 A | | 2/2016 |
| CN | 105354825 A | | 2/2016 |
| CN | 107606512 A | * | 1/2018 |
| CN | 108601133 A | * | 9/2018 |
| CN | 110458010 A | * | 11/2019 |
| CN | 111988895 A | * | 11/2020 |

OTHER PUBLICATIONS

Office action of counterpart application by SIPO dated Jun. 28, 2020.
Office action of counterpart application by SIPO dated May 31, 2021.

* cited by examiner

*Primary Examiner* — Delomia L Gilliard

(57) ABSTRACT

A lamp and a method for detecting a user's sitting posture are provided. The lamp is adapted to detect the user's sitting posture. The lamp comprises a lamp bracket, an image capturing unit and a processing unit. The image capturing unit is disposed on the lamp bracket and configured to capture a target image towards a desktop. The processing unit is coupled to the image capturing unit, wherein in response to that a head feature exists in the target image, the processing unit is configured to determine a reference information according to the head feature and to determine whether the reference information meets a poor sitting posture condition.

19 Claims, 4 Drawing Sheets

LAMP AND METHOD FOR DETECTING A SITTING POSTURE OF A USER

This application claims the benefit of People's Republic of China application Serial No. 201910522406.9, filed on Jun. 17, 2019, the subject matter of which is incorporated herein by reference.

BACKGROUND OF THE DISCLOSURE

Field of the Disclosure

The disclosure relates in general to a lamp and a method, and more particularly to a lamp and a method for detecting a user's sitting posture.

Description of the Related Art

Normally, smart lamp determines a sitting posture of a human body using infrared focal length detection. However, infrared focal length detection easily generates errors and has poor detection sensitivity, and therefore produces an unsatisfactory performance in detecting and correcting the sitting posture of the human body. Therefore, it has become a prominent task for the industries to provide an improved lamp for detecting a user's sitting posture.

SUMMARY OF THE DISCLOSURE

According to one aspect of the present disclosure, a lamp adapted to detect a user's sitting posture is provided. The lamp comprises a lamp bracket, an image capturing unit and a processing unit. The image capturing unit is disposed on the lamp bracket and configured to capture a target image towards a desktop. The processing unit is coupled to the image capturing unit. In response to that a head feature exists in the target image, the processing unit is configured to determine a reference information according to the head feature and determine whether the reference information meets a poor sitting posture condition.

According to another aspect of the present disclosure, a method for detecting a user's sitting posture is provided. The method is adapted to a lamp. The lamp comprises a lamp bracket, an image capturing unit and a processing unit. The method comprises capturing a target image towards a desktop by the image capturing unit; in response to that a head feature exists in the target image, determining a reference information according to the head feature by the processing unit; and determining whether the reference information meets a poor sitting posture condition by the processing unit.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

A number of embodiments of the disclosure are disclosed below with accompanying drawings. For the disclosure to be understood clearly, many details of practices are explained in the following disclosure. However, it should be understood that the details of practices are not for limiting the disclosure. That is, in some embodiments of the disclosure, the details of practices are not necessary. To simplify the drawings, some generally known structures and elements are schematically illustrated. Unless otherwise specified, element designations common to different drawings can be regarded as corresponding elements. These drawings are for describing the connection relationship between the elements of the embodiments, and the dimension scales used in the accompanying drawings are not based on actual proportion of the elements.

Figure 1A:
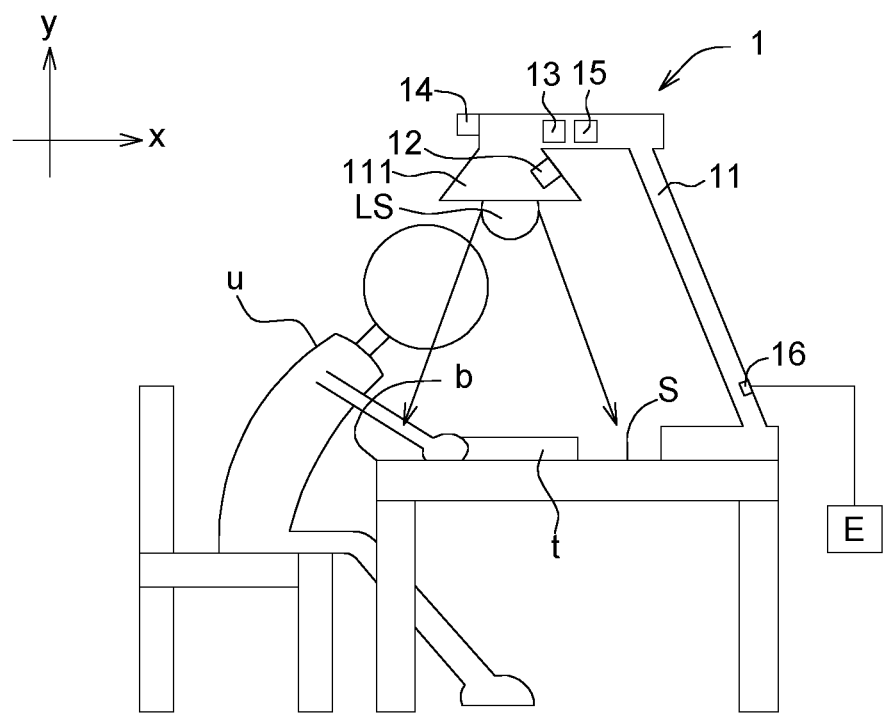
FIG. 1A is a schematic diagram of a lamp according to an embodiment of the disclosure.
Figure 1B:
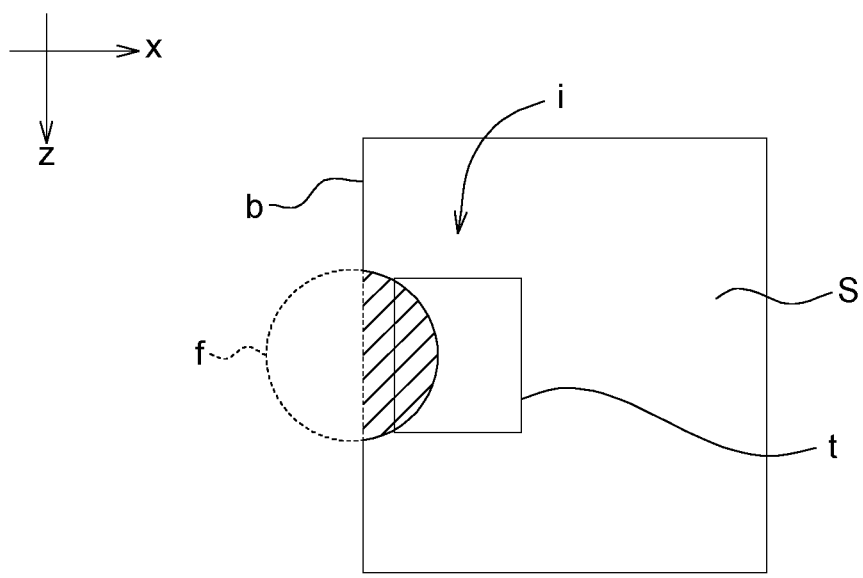
FIG. 1B is a schematic diagram of a target image and a head feature according to an embodiment of the disclosure.

FIG. 1A is a schematic diagram of a lamp according to an embodiment of the disclosure. FIG. 1B is a schematic diagram of a target image i and a head feature f according to an embodiment of the disclosure.

As illustrated in FIG. 1A, a user u is viewing a target object t on a desktop S; a lamp 1 is disposed on the desktop S to provide illumination and simultaneously detects the sitting posture of the user u viewing the target object t. The target object t can be the desktop S or any object, such as a book, a document, a laptop, a PC tablet or a mobile phone, etc. which is placed on the desktop S and viewed by the user u.

Figure 3A:
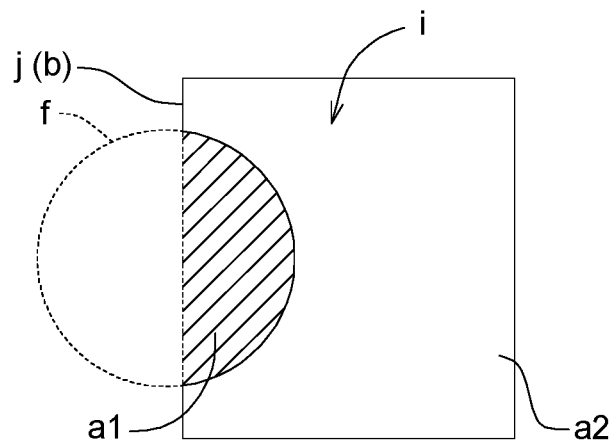
FIG. 3A is a schematic diagram of a target image and a head feature according to an embodiment of the disclosure.

The lamp 1 of the disclosure mainly comprises a lamp bracket 11, an image capturing unit 12 and a processing unit 13. As illustrated in FIGS. 1A and 1B, the image capturing unit 12 can be a camera; the image capturing unit 12 is disposed on the lamp bracket 11 and configured to capture a target image i towards the desktop S (the target image i is illustrated in FIG. 1B). Specifically, the image capturing unit 12 captures the content on the desktop S as the display frame of the target image i. In an embodiment, the image capturing range of the target image i captured by the image capturing unit 12 covers a front edge b of the desktop S. The front edge b is an edge of the desktop S near the user u. That is, if the image capturing range is outside the front edge b of the desktop S, an image edge j of the target image i (the image edge j is illustrated in FIG. 3A) can be used as the front edge b of the desktop S. In an embodiment, the lamp bracket 11 may further comprise a lamp holder 111, on which a light source LS and the image capturing unit 12 are disposed. The light source LS is configured to provide an illumination region on the desktop. The image capturing unit 12 can be disposed on the lamp holder 111, such that the part of the target image i captured by the image capturing unit 12 varies with the rotation of the lamp holder 111. Since the illumination region of the lamp holder 111 normally falls on the desktop S, the target image i captured by the image capturing unit 12 also is included in the image within the illumination region. That is, the target image i at least additionally comprises the image of the desktop S. The target image i comprises objects, such as stationary or books, in addition to the desktop.

The processing unit 13 is coupled to the image capturing unit 12. For example, the processing unit 13 and the image capturing unit 12 can be electrically connected through electric wiring. in response to that a head feature f of the user u exists in the target image I, the processing unit 13 determines a reference information according to the head feature f and the target image i, and the processing unit 13 determines whether the reference information meets a poor sitting posture condition. For example, the head feature f can be an information relevant to the user's head, such as the area, the circumference of head, the front edge of head, the shape of head or a combination thereof, but the disclosure is not limited thereto. If not any head feature f is shown in the display frame of the target image i, this indicates that the user's current sitting posture is good, and there is no need to correct the user's sitting posture. Conversely, as illustrated in FIG. 1B, once the head feature f is shown in the display frame of the target image i, this indicates that the user tilts forward or bows his/her head and the sitting posture is possible to turn into a poor sitting posture soon. Under such circumstances, the processing unit 13 determines a reference information according to the head feature f and the target image I and determines whether the reference information meets the predetermined poor sitting posture condition to make sure whether the user is in a poor sitting posture.

As illustrated in FIGS. 1A and 1B, in an embodiment, the lamp 1 may selectively comprise a reminder unit 14. The reminder unit 14 can be disposed on the lamp bracket 11. If the processing unit 13 determines that the reference information meets a poor sitting posture condition, the reminder unit 14 transmits a reminder message. The reminder unit 14 can be a signal device such as a micro display monitor, a buzzer or a warning light. The reminder message can be texts, sounds or indicator lights. Through the reminder message transmitted from the reminder unit 14, the user u understands that he/she is in a poor sitting posture and needs to adjust it to a correct sitting posture. Thus, the user can be reminded to adjust his/her sitting posture.

In an embodiment, the lamp 1 may further comprise an instruction unit 15. The instruction unit 15 is coupled to the processing unit 13 and configured to show an instruction message, such as a color changeable indicator light, which indicates whether the current positions of the lamp 1 and the image capturing unit 12 with respect to the desktop S are suitable. For example, if the position at which the lamp 1 is disposed allows the image capturing range of the image capturing unit 12 for capturing the target image i to at least cover the front edge b of the desktop S, this position is regarded as a suitable position. The instruction unit 15 can indicate that the lamp 1 is disposed at a suitable position by changing the color of the indicator light, for example, by turning a red light into a green light.

In an embodiment, the lamp 1 may further comprise a transmission unit 16 coupled to the processing unit 13. The transmission unit 16 can be a wired or wireless transmission interface. The target image i is transmitted to an external electronic device E via the transmission unit 16. The external electronic device E can be an external computer host. After the target image i is transmitted to the external electronic device E, the target image i can further be transmitted to a cloud database via the external electronic device E. The target image i can be processed and determined by the cloud database and then can be transmitted to the lamp 1.

Figure 2:
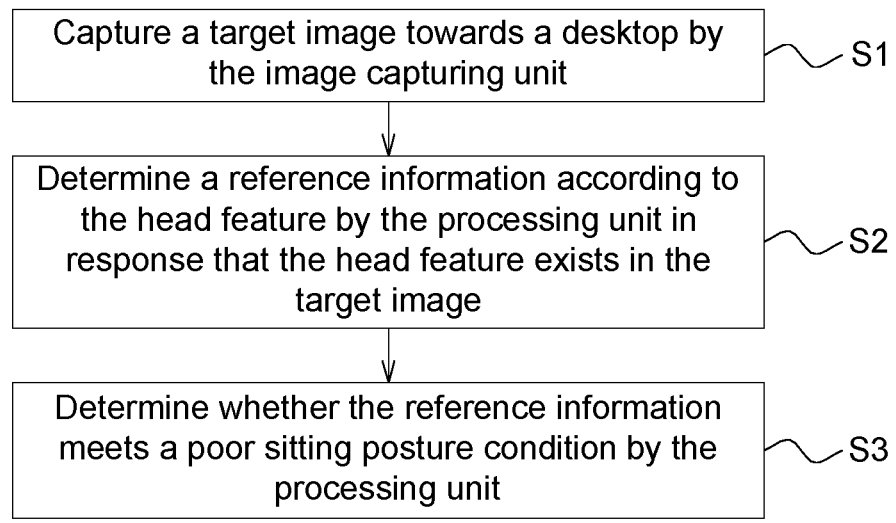
FIG. 2 is a flowchart of a method for detecting a user's sitting posture according to an embodiment of the disclosure.

FIG. 2 is a flowchart of a method 2 for detecting a sitting posture of a user u according to an embodiment of the disclosure. As illustrated in FIGS. 1A, 1B and 2, the method 2 comprises steps S1~S3. In step S1, a target image i is captured by the image capturing unit 12 towards the desktop S. In step S2, in response to that a head feature f exists in the target image i, a reference information is determined by the processing unit 13 according to the head feature f and the target image i. In step S3, whether the reference information meets a poor sitting posture condition is determined by the processing unit 13. Detailed descriptions of step S2 and step S3 are disclosed below in a number of embodiments with FIG. 2, a flowchart of a method 2 for detecting a user's sitting posture.

Figure 3B:
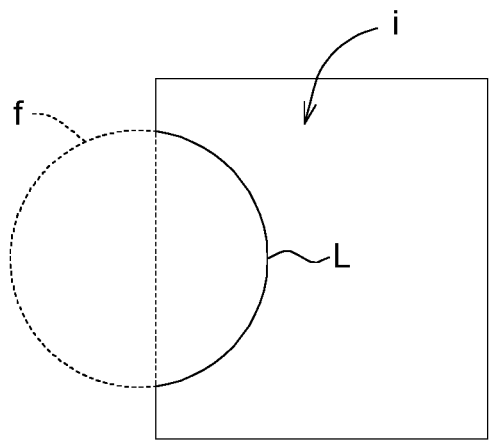
FIG. 3B is a schematic diagram of a target image and a head feature according to an embodiment of the disclosure.
Figure 3C:
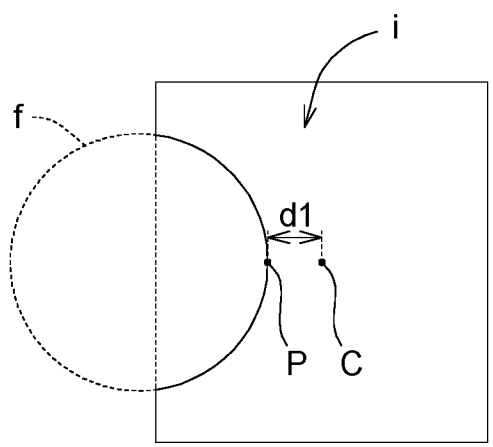
FIG. 3C is a schematic diagram of a target image and a head feature according to an embodiment of the disclosure.
Figure 4:
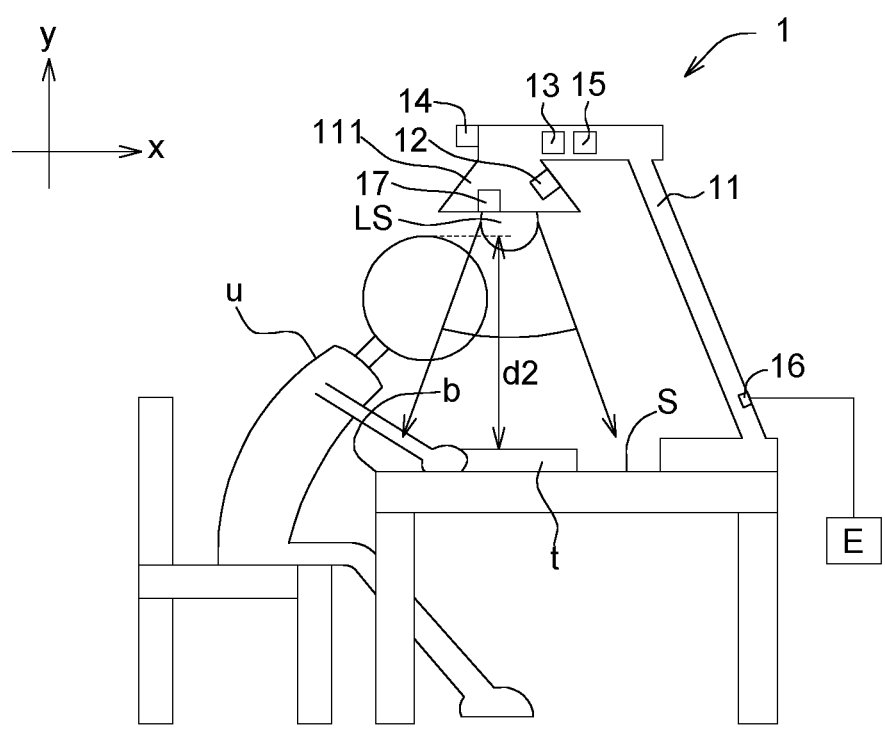
FIG. 4 is a schematic diagram of a lamp according to another embodiment of the disclosure.

FIGS. 3A, 3B and 3C are schematic diagrams of a target image i and a head feature f according to an embodiment of the disclosure. FIG. 4 is a schematic diagram of a lamp 1 according to another embodiment of the disclosure.

In an embodiment, as illustrated in FIGS. 1A and 3A, the head feature f can be an area a1 of the head. The processing unit 13 calculates a ratio of an area a1 of the head feature f to a total area a2 of the target image i, and uses the ratio as the reference information. As the user bows his/her head more deeply, the area of the head feature a1 shown in the display frame of the target image i will increase. Since the total area a2 of the target image i is dependent on the image capturing range of the image capturing unit 12, in the present embodiment, the poor sitting posture condition can be set as: the ratio of the area a1 of the head feature f to the total area a2 of the target image i is greater than a threshold, and whether the user over-bows his/her head can be determined according to whether the ratio is greater than the threshold. The target image i may further comprise a desktop image, and whether the user over-bows his/her head can be determined according to the ratio of the area a1 of the head feature f to the total area of the desktop image. Moreover, the threshold can be set according to the image capturing range of the image capturing unit 12. In response to that the processing unit 13 calculates and determines that the ratio is greater than the threshold, the processing unit 13 determines that the reference information meets the poor sitting posture condition, which indicates that the user over-bows his/her head and is in a poor sitting posture, and transmits a reminder message.

In an embodiment, as illustrated in FIGS. 1A and 3B, the head feature f can be a circumference length L. The processing unit 13 calculates the circumference length L of the head feature f shown in the target image i, and uses the circumference length L as the reference information. As the user u bows his/her head more deeply, the circumference length L of the head feature f also increases. Therefore, the poor sitting posture condition can be set as: the circumference length L of the head feature f is greater than a threshold, and whether the user over-bows his/her head can be determined according to whether the circumference length L is greater than the threshold. In response to that the processing unit 13 calculates and determines that the circumference length L is greater than the threshold, the processing unit 13 determines that the reference information meets the poor sitting posture condition, which indicates that the user over-bows his/her head and is in a poor sitting posture, and transmits a reminder message.

In an embodiment, as illustrated in FIGS. 1A and 3C, the head feature f can be a front edge of the head. The processing unit 13 calculates a distance d1 between the front edge position P of the head feature f shown in the target image i and the center position C of the target image i, and uses the distance d1 as the reference information. As the user u bows his/her head more deeply, the front edge position P of the head feature f will gradually move towards the center position C of the target image I; and as the center position P and the center position C get closer to each other, the distance d1 between the front edge position P and the center position C will gradually diminish. Therefore, the poor sitting posture condition can be set as: the distance d1 between the front edge position P and the center position C is less than a threshold, and whether the user over-bows his/her head can be determined according to whether the distance d1 is greater than the threshold. In response to that the processing unit 13 calculates and determines that distance d1 is greater than the threshold, the processing unit 13 determines that the reference information meets the poor sitting posture condition, which indicates that the user over-bows his/her head and is in a poor sitting posture, and transmits a reminder message.

As illustrated in FIG. 4, the lamp 1 may further comprise a distance detection unit 17, which can be disposed on the lamp bracket 11 (such as on the lamp holder 111). The distance detection unit 17 can be an infrared sensor configured to detect a focal distance of the target object. The distance detection unit 17 can detect the focal distance of the head feature f as well as the focal distance of the target object t on the desktop S to obtain a distance d2 between the head feature f and the target object t on the desktop S in a vertical direction (such as the Y direction). The processing unit 13 uses the distance d2 as the reference information, and determines whether the reference information meets the poor sitting posture condition according to the distance d2. In the present embodiment, the poor sitting posture condition can be set as: the distance d2 is less than a threshold, which can be set according to a good reading distance (such as 35 cm). In response to that the processing unit 13 determines that the distance d2 is less than 35 cm, the processing unit 13 determines that the reference information meets the poor sitting posture condition, which indicates that the user over-bows his/her head and is in a poor sitting posture, and transmits a reminder message.

Moreover, the sitting posture of the user u can be detected according to a combination of the methods disclosed in the embodiments of FIGS. 3A-3C and 4 for determining whether the reference information meets the poor sitting posture condition.

In an embodiment, before step S1 of the method 2, that is, before the target image i is captured by the image capturing unit 12 towards the desktop S, that is, the method 2 may further comprise: showing an instruction message, which indicates the positions of the lamp 1 and the image capturing unit 12 with respect to the desktop S, by the instruction unit 15 of the lamp 1. Detailed descriptions of the instruction unit 15 and the instruction message can be obtained with reference to the above disclosure, and are not repeated here.

In an embodiment, the method 2 may further comprise: transmitting the target image i to an external electronic device E via the transmission unit 16. Detailed descriptions of the transmission unit 16 can be obtained with reference to the above disclosure, and are not repeated here.

According to the lamp and the method for detecting a user's sitting posture disclosed in above embodiment, the processing unit captures a target image of a desktop, calculates a reference information according to the target image and a head feature of the target image, and determines whether the reference information meets a poor sitting posture condition. Thus, in response to that the user is viewing an object on a desktop, the lamp can determine whether the user is in a poor sitting posture, and remind the user to correct his/her poor sitting posture.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lamp adapted to detect a user's sitting posture, comprising:
   a lamp bracket;
   an image capturing unit disposed on the lamp bracket and configured to capture a target image towards a desktop; and
   a processing unit coupled to the image capturing unit, wherein in response to that a head feature exists in the target image, the processing unit is configured to determine a reference information according to the head feature and the target image and to determine whether the reference information meets a poor sitting posture condition, wherein the processing unit is configured to calculate a ratio of an area of a portion of the head feature to a total area of the target image and determine the reference information according to the ratio of the area of the portion of the head feature to the total area of the target image.

2. The lamp according to claim 1, wherein an image capturing range of the image capturing unit covers a front edge of the desktop, the front edge is an edge of the desktop near the user, and an image edge of the target image is the front edge.

3. The lamp according to claim 1, wherein the lamp further comprises a reminder unit disposed on the lamp bracket, and the reminder unit is configured to transmit a reminder message in response to that the reference information meets the poor sitting posture condition.

4. The lamp according to claim 1, wherein the lamp further comprises a distance detection unit coupled to the image capturing unit and the processing unit, wherein the distance detection unit is configured to detect a distance between the head feature and a target object located on the desktop in a vertical direction, and the processing unit is configured to use the distance as the reference information.

5. The lamp according to claim 4, wherein the poor sitting posture condition is that the distance is less than a threshold.

6. The lamp according to claim 1, wherein the target image comprises a desktop image, and the processing unit is configured to determine the reference information further according to a ratio of the area of the portion of the head feature to an area of the desktop image.

7. The lamp according to claim 1, wherein the lamp further comprises an instruction unit coupled to the processing unit, the instruction unit is configured to show an instruction message to indicate positions of the lamp and the image capturing unit with respect to the desktop.

8. The lamp according to claim 1, wherein the lamp further comprises a transmission unit coupled to the processing unit, and the target image is transmitted to an external electronic device via the transmission unit.

9. The lamp according to claim 1, wherein the lamp bracket further comprises a lamp holder, a light source and the image capturing unit are disposed on the lamp holder, the light source is configured to provide an illumination region on the desktop, and the target image is included in an image within the illumination region.

10. A method for detecting a user's sitting posture, wherein the method is adapted to a lamp comprising a lamp bracket, an image capturing unit and a processing unit, and the method comprises:
- capturing a target image towards a desktop by the image capturing unit, wherein the target image comprises a desktop image;
- in response to that a head feature exists in the target image, determining a reference information according to the head feature by the processing unit; and
- determining whether the reference information meets a poor sitting posture condition by the processing unit, wherein the processing unit is configured to determine the reference information according to a ratio of an area of a portion of the head feature to an area of the desktop image.

11. The method according to claim 10, wherein an image capturing range of the image capturing unit covers a front edge of the desktop, the front edge is an edge of the desktop near the user, and an image edge of the target image is the front edge.

12. The method according to claim 10, further comprising:
- transmitting a reminder message by a reminder unit of the lamp in response to that the reference information meets the poor sitting posture condition.

13. The method according to claim 10, further comprising:
- detecting a distance between the head feature and a target object located on the desktop in a vertical direction; and
- using the distance as the reference information.

14. The method according to claim 13, wherein the poor sitting posture condition is that the distance is less than a threshold.

15. The method according to claim 10, wherein the reference information is determined further according to a ratio of the area of the portion of the head feature to a total area of the target image.

16. The method according to claim 15, wherein the poor sitting posture condition is that the ratio of the area of the portion of the head feature to the total area of the target image is greater than a threshold.

17. The method according to claim 10, wherein before the step of capturing the target image towards the desktop, the method further comprises:
- showing an instruction message by an instruction unit of the lamp to indicate positions of the lamp and the image capturing unit with respect to the desktop.

18. The method according to claim 10, further comprising:
- transmitting the target image to an external electronic device.

19. The method according to claim 10, wherein the lamp bracket further comprises a lamp holder, a light source and the image capturing unit are disposed on the lamp holder, and the method further comprises:
- providing an illumination region on the desktop by the light source, wherein the target image is included in an image within the illumination region.

* * * * *